(12) United States Patent
Aggarwal et al.

(10) Patent No.: US 11,108,689 B1
(45) Date of Patent: Aug. 31, 2021

(54) INCORPORATING A GENERIC ASSOCIATED CHANNEL (G-ACH) HEADER AND CHANNEL-TYPE FOR CONNECTIVITY FAULT MANAGEMENT (CFM) PACKETS OVER MULTI-PROTOCOL LABEL SWITCHING (MPLS)

(71) Applicant: Ciena Corporation, Hanover, MD (US)

(72) Inventors: Ashutosh Aggarwal, Gurgaon (IN); Aditya Mittal, Gurgaon (IN); Pankaj Verma, Kanpur (IN); Sudipta Das, New Delhi (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/826,365

(22) Filed: Mar. 23, 2020

(30) Foreign Application Priority Data

Feb. 7, 2020 (IN) .............................. 202011005565

(51) Int. Cl.
| | |
|---|---|
| *H04L 12/723* | (2013.01) |
| *H04L 12/721* | (2013.01) |
| *H04L 29/06* | (2006.01) |
| *H04L 12/46* | (2006.01) |
| *H04L 12/26* | (2006.01) |

(52) U.S. Cl.
CPC .............. *H04L 45/50* (2013.01); *H04L 12/46* (2013.01); *H04L 43/0811* (2013.01); *H04L 45/68* (2013.01); *H04L 69/22* (2013.01); *H04L 2212/00* (2013.01)

(58) Field of Classification Search
CPC ..... H04L 45/50; H04L 12/46; H04L 43/0811; H04L 45/68; H04L 69/22; H04L 2212/00; H04L 43/10; H04L 45/26; H04L 45/34
See application file for complete search history.

(56) References Cited

U.S. PATENT DOCUMENTS

| | | | |
|---|---|---|---|
| 8,184,526 B2 | 5/2012 | Duncan et al. | |
| 9,485,175 B2 | 11/2016 | Abdul et al. | |
| 9,537,846 B2 | 1/2017 | Jethanandani et al. | |
| 9,667,559 B2 | 5/2017 | Bhattacharya | |
| 10,193,765 B2 | 1/2019 | Holness et al. | |
| 10,404,540 B2 | 9/2019 | Sekhri et al. | |
| 2013/0051245 A1* | 2/2013 | Ding ...................... | H04L 43/10 370/241.1 |

(Continued)

*Primary Examiner* — Kibrom T Hailu
(74) *Attorney, Agent, or Firm* — Clements Bernard Walker; Lawrence A. Baratta, Jr.; Christopher L. Bernard (57) ABSTRACT

Systems and methods for incorporating a new channel-type value in the header of a Generic Associated Channel (G-ACh) for Connectivity Fault Management (CFM) Layer-2 packets over Multi-Protocol Label Switching (MPLS) networks are provided. The channel-type value of the G-ACh header may be used for identification of the network-generated CFM Layer-2 packets. In one implementation, a system may include a processing device and a memory device, where the memory device may be configured to store instructions that, when executed, cause the processing device to obtain a Connectivity Fault Management (CFM) packet, encapsulate the CFM packet with Pseudo-Wire (PW) and Label-Switched Path (LSP) labels to create an expanded packet, and incorporate a specific channel-type value in a G-ACh header of the expanded packet to uniquely identify the CFM packet.

15 Claims, 6 Drawing Sheets

(56) References Cited

U.S. PATENT DOCUMENTS

| | | | |
|---|---|---|---|
| 2013/0176850 A1* | 7/2013 | Mishra | H04L 12/46 370/235 |
| 2013/0235875 A1* | 9/2013 | Mohan | H04L 12/4616 370/395.53 |
| 2013/0272114 A1* | 10/2013 | Ye | H04L 45/28 370/219 |
| 2014/0086040 A1* | 3/2014 | Takahashi | H04L 45/22 370/216 |
| 2014/0112124 A1* | 4/2014 | Sivabalan | H04L 45/28 370/228 |
| 2015/0016245 A1* | 1/2015 | Ra | H04L 41/0654 370/228 |
| 2015/0043330 A1* | 2/2015 | Hu | H04L 45/68 370/225 |
| 2015/0124626 A1* | 5/2015 | Sul | H04L 43/10 370/241.1 |
| 2015/0229550 A1* | 8/2015 | Addeo | H04L 43/0811 709/224 |
| 2015/0295725 A1* | 10/2015 | Yuan | H04L 12/185 370/390 |
| 2016/0156540 A1 | 6/2016 | Hu et al. | |
| 2017/0230234 A1* | 8/2017 | Wang | H04L 41/00 |
| 2019/0394180 A1* | 12/2019 | Spahn | G06F 21/602 |

* cited by examiner

INCORPORATING A GENERIC ASSOCIATED CHANNEL (G-ACH) HEADER AND CHANNEL-TYPE FOR CONNECTIVITY FAULT MANAGEMENT (CFM) PACKETS OVER MULTI-PROTOCOL LABEL SWITCHING (MPLS)

TECHNICAL FIELD

The present disclosure generally relates to networking systems and methods. More particularly, the present disclosure relates to identifying network-generated Connectivity Fault Management (CFM) Layer-2 packets transmitted over a Multi-Protocol Label Switching (MPLS) network using a Generic Associated Channel (G-ACh) channel-type.

BACKGROUND

Connectivity Fault Management (CFM), as defined in IEEE 802.1ag, is commonly used in a service provider network as a mechanism to monitor various Quality of Service (QoS) aspects (e.g., delay, loss, etc.). CFM involves the configuration of Maintenance End Points (MEPs), and Maintenance Associations, at specified points or nodes in the service provider network and the monitoring of the QoS at a given service level.

However, the existing approach has several disadvantages. For example, in a Software-Defined Network (SDN) environment, where there is a common configuration manager, having Deep Packet Inspection (DPI) filters will lead to increased complexity and increased project maintenance and release upgradation costs, as these DPI filters are generally hardware-specific. When the CFM packet filtering using DPI is either hardware- or software-specific, an SDN controller would need to maintain a list of all such possible DPI filters and use only the one that is needed for the particular node type.

Another disadvantage of conventional systems is that when a Y.1731 Delay Measurement (DM) session is configured in hardware at a second Provider Edge (PE) of an MPLS-based service provider network, the network may experience incorrect behavior due to extra latency or loss of packets introduced in the packet path. The network behavior would normally be undesirable for a customer.

Also, conventional systems may have other disadvantages, such as incorrect filtering of incoming CFM packets or any other traffic streams at the second PE, which may be due to specific DPI filtering. This incorrect filtering may lead to CPU overloading, service outage, Service Level Agreement (SLA) miscalculations, security risks, among other negative consequences. These issues could have a major impact on a business.

Currently, there are no standards provided by the Internet Engineering Task Force (IETF) or International Telegraph Union-Telecommunication standardization section (ITU-T) which guide the encapsulation of CFM payload over an MPLS network.

Therefore, there is a need in the field of CFM in an MPLS system to minimize or eliminate the above-mentioned disadvantages associated with conventional systems.

BRIEF SUMMARY

The present disclosure is directed to systems and methods for incorporating a new channel-type value in the Generic Associated Channel (G-ACh) header to uniquely identify incoming Connectivity Fault Management (CFM) Layer-2 packets over Multi-Protocol Label Switching (MPLS) networks. A specific channel type in the G-ACh header may be used for identification of the network-generated CFM packets. According to one embodiment, a system may include a processing device and a memory device configured to store instructions. The instructions, when executed, may be configured to cause the processing device to obtain a Connectivity Fault Management (CFM) packet, encapsulate the CFM packet with Pseudo-Wire (PW) and Label-Switched Path (LSP) labels to create an expanded packet, and incorporate a specific channel-type value in a G-ACh header of the expanded packet to uniquely identify the CFM packet.

According to another embodiment, a device or component in a Multi-Protocol Label Switching (MPLS) network is provided. The device may be configured to obtain a CFM packet, encapsulate the CFM packet with PW and LSP labels to create an expanded packet, and incorporate a specific channel-type value in a Generic Associated Channel (G-ACh) header of the expanded packet to uniquely identify the CFM packet.

According to yet another embodiment, the present disclosure describes a non-transitory computer-readable medium configured to store computer logic. The computer logic may include instructions that, when executed, cause one or more processing devices to obtain a CFM packet, encapsulate the CFM packet with PW and LSP labels to create an expanded packet, and incorporate a specific channel-type value in a Generic Associated Channel (G-ACh) header of the expanded packet to uniquely identify the CFM packet.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Multi-Protocol Label Switching (MPLS) is a network routing process that routes data from one node to another based on "labels." The labels identify a number of short paths or links between a source node and a destination node, instead of simply routing to the destination node using a long network address. MPLS can encapsulate packets of various network routing protocols, hence the name "multi-protocol."

By using MPLS, it is possible to avoid the complexity of looking up addresses in a routing table, which can lead to increases in traffic flow.

Connectivity Fault Management (CFM) is a process defined in the IEEE 802.1ag standard for use in Local Area Networks (LANs), Metropolitan Area Networks (MANs), and other suitable types of networks. The processes of CFM include the actions of Operations, Administration, and Maintenance (OAM) for monitoring transmission paths through routers, switches, bridges, and other network elements. Specifically, CFM includes the exchange of CFM packets between nodes for determining OAM. The IEEE 802.1ag standard defines maintenance domains, constituent maintenance points, and the managed objects required to create and administer them. The standard also defines the relationship between maintenance domains and services offered by Virtual LAN (VLAN) bridges or service provider bridges. In addition, the standard defines the protocols and procedures used by maintenance points to maintain and diagnose connectivity faults within a maintenance domain.

The present disclosure is configured to use standard MPLS control headers to encapsulate the service provider CFM packet for an "up" Maintenance-association End Point (UP MEP) at a first Provider Edge (PE-1), using a particular "channel-type" of a Generic Associated Channel (G-ACh), as described in the present disclosure. The channel-type of the G-ACh may be used to identify CFM Layer-2 packets over MPLS.

An MEP, as described in the present disclosure, may include a point at the edge of a domain and may be used to define a boundary for the domain. The MEP may be configured to send and receive CFM frames through an MPLS cloud. An UP MEP may include Protocol Data Units (PDUs) of the CFM generated by the MEP, which may be sent toward a router's relay function, whereby a "down" MEP (DOWN MEP) may include PDUs of the CFM that are sent via a path connected to a port where the MEP is configured. An UP MEP may be created on a User-Network Interface (UNI), whereas a Down MEP may be created on a Network-to-Network Interface (NNI). Packets of the UP MEPs may follow a service path to a specific destination in the network, whereas packets of the Down MEPs created on the NNI may be transmitted directly out of the port.

The channel-type of the G-ACh can be utilized by a peer Provider Edge (PE) device (e.g., PE-2) in order to uniquely identify the packet as a CFM control packet. By encapsulating the CFM packets in this way and filtering CFM packets, the embodiments of the present disclosure may be able to resolve many of the disadvantages of conventional systems.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 1:
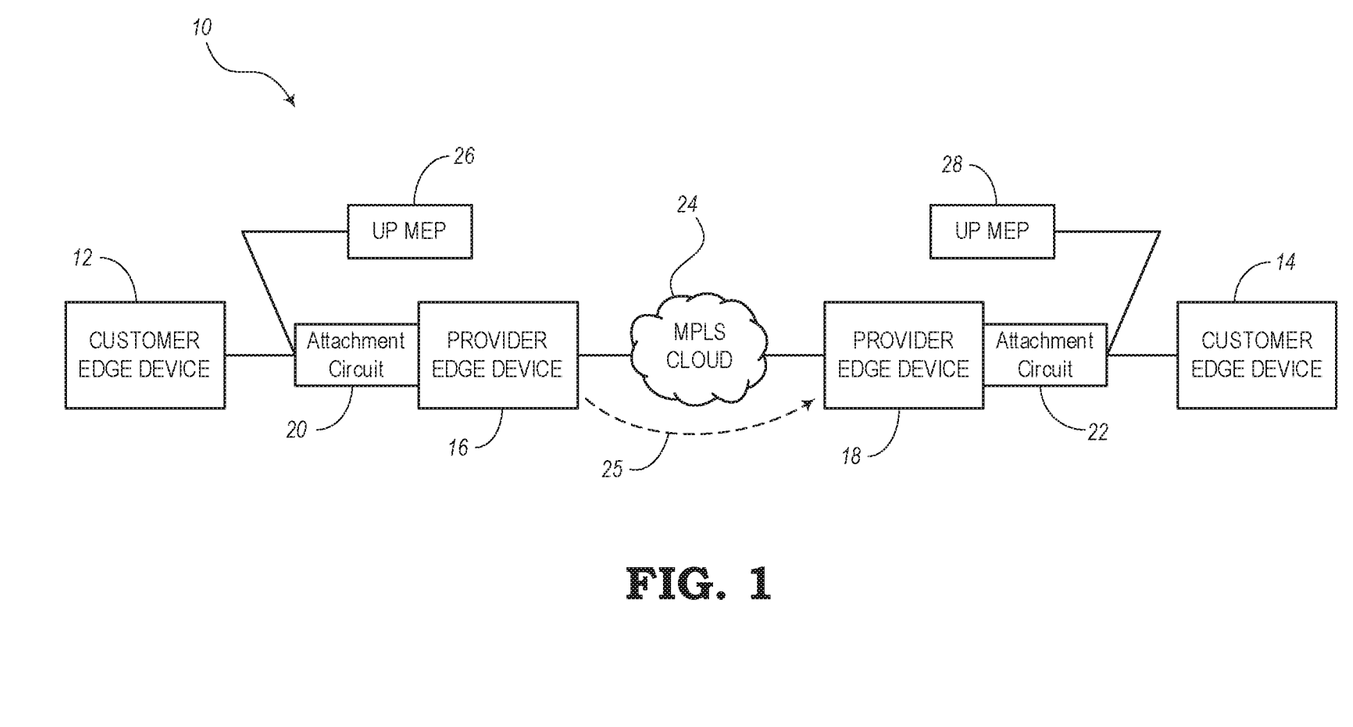
FIG. 1 is a block diagram showing a network enabling communication between customer edge devices, according to some embodiments of the present disclosure.

FIG. 1 is a block diagram illustrating an embodiment of a network 10 for enabling communication between two customer networks. The network 10 in this embodiment includes a first Customer Edge (CE) device 12, or end-user device, and a second CE device 14, or end-user device. The first and second CE devices 12, 14 may be configured to communicate with each other on a customer level in a CFM (i.e., IEEE 802.1ag) architecture. The CE devices 12, 14 may be configured as routers, switches, bridges, or other suitable network devices.

The network 10 also includes a first Provider Edge (PE) device 16 and a second PE device 18. The PE devices 16, 18 may be configured as routers, switches, bridges, or other suitable network devices. The first PE device 16 is configured to be connected to the first CE device 12 via a first Attachment Circuit (AC) device 20. Likewise, the second PE device 18 is configured to be connected to the second CE device 14 via a second AC device 22. The CE devices 12, 14 may communicate with the corresponding PE devices 16, 18 using either an External Gateway Protocol (EGP), such as the Border Gateway Protocol (BGP), or an Interior Gateway Protocol (IGP), such as the Open Shortest Path First (OSPF) protocol.

The first PE device 16 may communicate with the second PE device 18 via a MPLS cloud 24 in a provider level of the CFM architecture. According to some embodiments, the MPLS cloud 24 may include an MPLS Pseudo-Wire (PW) 25 for connecting the first and second PE devices 16, 18. The connection may include one or more tunnels or PWs, which may be configured as Packet-Switching Network (PSN) tunnels.

The first and second AC devices 20, 22 may specifically be implemented in an MPLS Layer-2 Virtual Private Network (VPN). Thus, the MPLS-based network 10 may be configured to offer MPLS Layer-2 VPN service to connect the two customer networks using the CE devices 12, 14.

In addition, the network 10 is configured such that the PE devices 16, 18 may each utilize an UP MEP. Specifically, a first UP MEP device 26 may be configured on the side where the first AC device 20 is attached to the first PE device 16. Also, a second UP MEP device 28 may be configured on the side where the second AC device 22 is attached to the second PE device 18. The first and second UP MEP devices 26, 28 may be configured on the AC device side to enable monitoring (e.g., Service Level Agreement monitoring, etc.) of the network 10.

As mentioned above, there are no IETF or ITU-T standards which guide the encapsulation of Y.1731/CFM Layer-2 packets over an MPLS network. Thus, the network 10 may be modified in some implementations such that the UP MEP devices 26, 28 encapsulate the complete CFM packet (including the L2 header) "directly" onto the PW of the MPLS cloud 24 and encapsulate LSP labels at the first PE device 16. The peer node (i.e., the second PE device 18 in the embodiment of FIG. 1) may be configured to filter this packet by differentiating it from other control and data streams by using Deep Packet Inspection (DPI) to pick Ether-Type of the payload CFM payload.

However, it is possible that the network 10 may have certain issues that may not be ideal in a CFM environment. For instance, in a Software-Defined Network (SDN) environment where there is a common configuration manager, the incorporation of DPI filters in the network 10 may lead to increased complexity, as these CFM packet filters using DPI may generally be hardware specific. Therefore, an SDN controller may need to maintain a list of all such possible filters and select the correct one according to the node type.

Also, when a Y.1731 DM session is configured in hardware at the second PE device 18, the network 10 may experience incorrect behavior due to extra latency or loss of packets introduced in the packet path. Furthermore, incorrect filtering of incoming CFM packets at the second PE device 18 (e.g., due to specific DPI filtering) may lead to overloading a CPU, service outage, incorrect SLA calculations, security risks, etc., which could impact a business in a major way. Thus, the network 10 may be modified, as mentioned below with respect to some preferred embodiments, to overcome these potential negative consequences.

Figure 2:
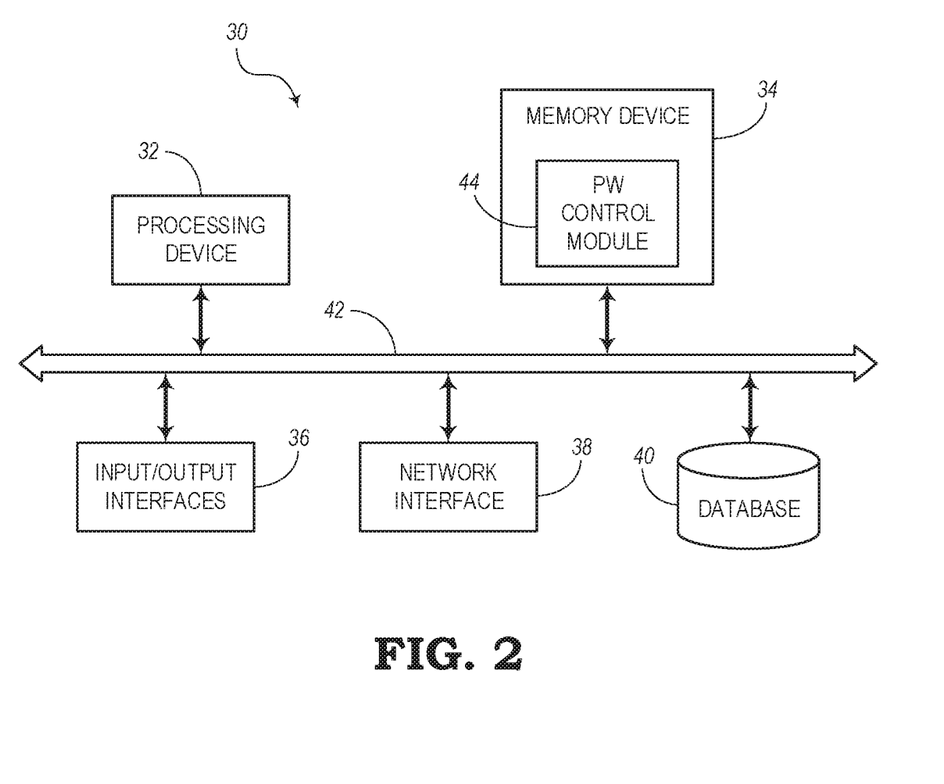
FIG. 2 is a block diagram showing a management device for controlling aspects of a Multi-Protocol Label Switching (MPLS) cloud of the network shown in FIG. 1, according to some embodiments.

FIG. 2 is a block diagram illustrating an embodiment of a management device 30 for controlling aspects of the MPLS cloud 24 within the network 10 of FIG. 1. In the illustrated embodiment, the management device 30 may be a digital computer that, in terms of hardware architecture, generally includes a processing device 32, a memory device 34, input/output (I/O) interfaces 36, a network interface 38, and a database 40. The memory device 34 may include a data store, database (e.g., database 40), or the like. It should be appreciated by those of ordinary skill in the art that FIG. 2 depicts the management device 30 in a simplified manner, where practical embodiments may include additional components and suitably configured processing logic to support known or conventional operating features that are not described in detail herein. The components (i.e., 32, 34, 36, 38, 40) are communicatively coupled via a local interface 42. The local interface 42 may be, for example, but not limited to, one or more buses or other wired or wireless connections. The local interface 42 may have additional elements, which are omitted for simplicity, such as controllers, buffers, caches, drivers, repeaters, receivers, among other elements, to enable communications. Further, the local interface 42 may include address, control, and/or data connections to enable appropriate communications among the components 32, 34, 36, 38, 40.

The processing device 32 is a hardware device adapted for at least executing software instructions. The processing device 32 may be any custom made or commercially available processor, a central processing unit (CPU), an auxiliary processor among several processors associated with the management device 30, a semiconductor-based microprocessor (in the form of a microchip or chip set), or generally any device for executing software instructions. When the management device 30 is in operation, the processing device 32 may be configured to execute software stored within the memory device 34, to communicate data to and from the memory device 34, and to generally control operations of the management device 30 pursuant to the software instructions.

It will be appreciated that some embodiments of the processing device 32 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 32 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 36 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 36 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 38 may be used to enable the management device 30 to communicate over a network, such as the network 10, the Internet, a wide area network (WAN), a local area network (LAN), and the like. The network interface 38 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 38 may include address, control, and/or data connections to enable appropriate communications on the network 10.

The memory device 34 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 34 may incorporate electronic, magnetic, optical, and/or other types of storage media. The memory device 34 may have a distributed architecture, where various components are situated remotely from one another, but can be accessed by the processing device 32. The software in memory device 34 may include one or more software programs, each of which may include an ordered listing of executable instructions for implementing logical functions. The software in the memory device 34 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 34 may include a data store used to store data. In one example, the data store may be located internal to the management device 30 and may include, for example, an internal hard drive connected to the local interface 42 in the management device 30. Additionally, in another embodiment, the data store may be located external to the management device 30 and may include, for example, an external hard drive connected to the I/O interfaces 36 (e.g., SCSI or USB connection). In a further embodiment, the data store may be connected to the management device 30 through a network and may include, for example, a network attached file server.

Moreover, some embodiments may include a non-transitory computer-readable storage medium having computer readable code stored in the memory device 34 for programming the management device 30 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 32 that, in response to such execution, cause the processing device 32 to perform a set of operations, steps, methods, processes, algorithms, functions, techniques, etc. as described herein for the various embodiments.

In particular, the management device 30 may include a Pseudo-Wire (PW) control module 44, which may be implemented in hardware, software, firmware, or any combination thereof. In some embodiments, the PW control module 44 may be stored as software or firmware in the memory device 34 or other non-transitory computer-readable medium. In this respect, the PW control module 44 may include logic instructions for causing one or more processing devices (e.g., the processing device 32) to perform certain functions or steps.

For example, the PW control module 44 may be configured to use standard MPLS control headers to encapsulate the provider CFM packet for the first UP MEP 26 at the first PE device 16. According to the various embodiments of the present disclosure, the PW control module 44 may use a new Generic Associated Channel (G-ACh) "channel-type" to identify CFM Layer-2 packets over MPLS. The new G-ACh channel-type may be used to aid the second PE device 18 to uniquely identify the packet as a CFM control packet. By encapsulating and filtering CFM packets to modify the network 10, the PW control module 44 may be configured to overcome at least some of the problem scenarios that may otherwise be inherent in conventional systems or inherent in the network 10.

Furthermore, the PW control module 44 may be configured to modify the Control Channel (CC) of the PW of the MPLS cloud 24. The CC may be modified by the PW control module 44 to enable CFM over the PWs of the MPLS cloud 24. For example, when the PW control module 44 sets the PW such that the CC-type is equal to 1, a PW label header would be followed by G-ACh. When the PW is set such that the CC-type is equal to 4, the PW label header would be followed by a G-Ach Label (GAL) and then followed by G-ACh.

For CFM over the MPLS tunnels of the MPLS cloud 24, the PW control module 44 may be configured to modify the MPLS tunnel label header such that it would be followed by GAL and then G-ACh. Additionally, this solution would also be able to handle other proprietary or non-standard control streams presently used in systems using Inter-Switch Trunk (IST) packets (e.g., Inter-Chassis Link (ICL), etc.) The IST packets may be transmitted over the PW and may be used in Multi-Chassis-Link Aggregation Group (MC-LAG) configurations.

Figure 3:
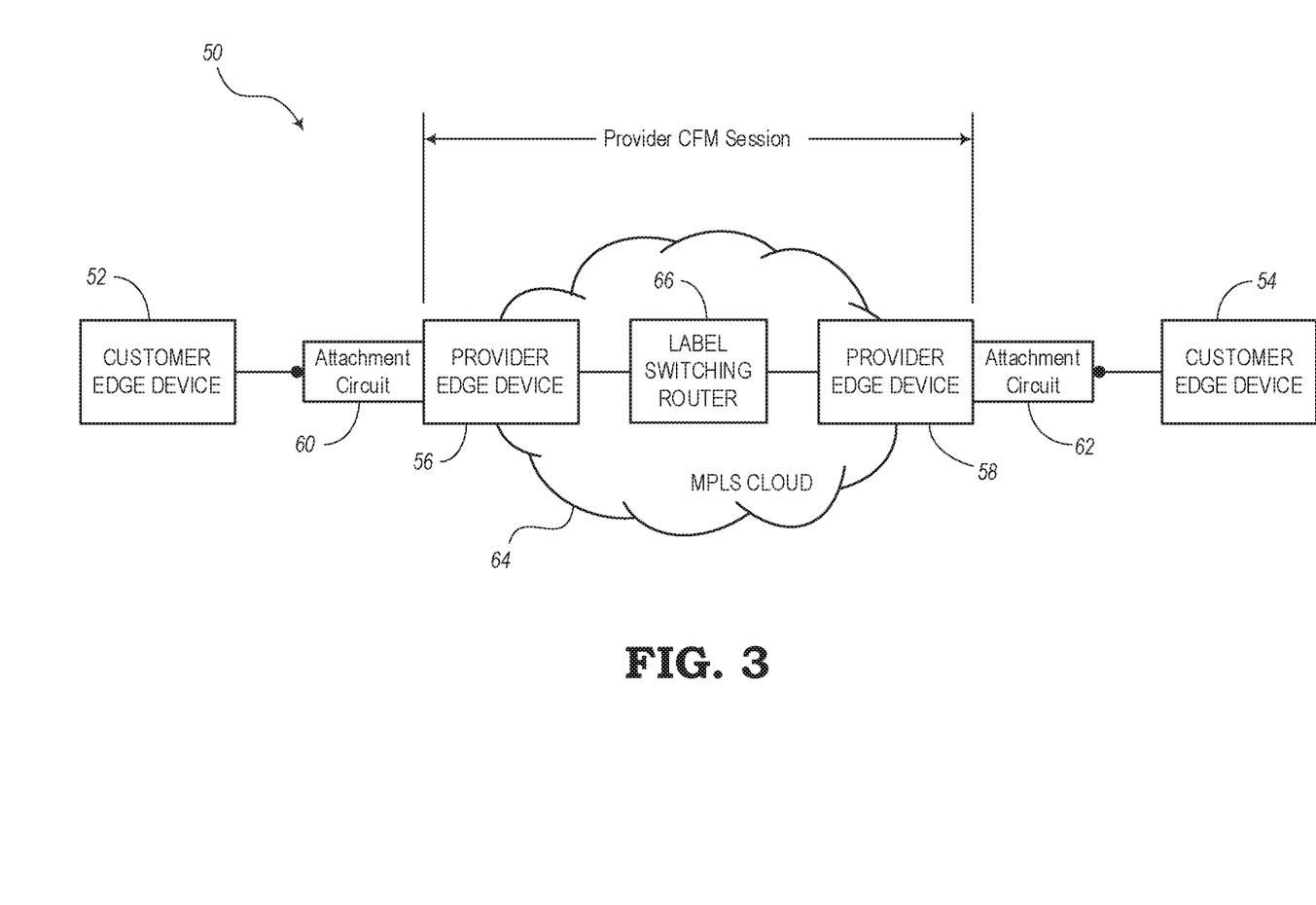
FIG. 3 is a block diagram showing another network for enabling communication between two Customer Edge (CE) devices, according to preferred embodiments of the present disclosure.

FIG. 3 is a block diagram illustrating an embodiment of another network 50 for enabling communication between two customer networks. In this embodiment, the network 50 includes a first Customer Edge (CE) device 52 and a second CE device 54. The first and second CE devices 52, 54 may be configured to communicate with each other on a customer level in a CFM (i.e., IEEE 802.1ag) architecture. The network 50 also includes a first Provider Edge (PE) device 56 and a second PE device 58. The first PE device 56 is configured to be connected to the first CE device 52 via a first Attachment Circuit (AC) device 60, and the second PE device 58 is configured to be connected to the second CE device 54 via a second AC device 62. The CE devices 52, 54 may communicate with the corresponding PE devices 56, 58 using either an External Gateway Protocol (EGP) (e.g., Border Gateway Protocol (BGP)) or an Interior Gateway Protocol (IGP) (e.g., Open Shortest Path First (OSPF) protocol).

The first PE device 56 may be configured to communicate with the second PE device 58 via a MPLS cloud 64 in a provider level of the CFM architecture. The MPLS cloud 64 of the network 50 includes a Label Switching Router (LSR) 66, which may be configured to perform routing based on a new label (based on a channel) and may be configured to switch labels by removing an old label and replacing it with a new one. The LSR 66 is configured to receive a packet and use a label included in the header of this packet as an index to determine the next hop on the Label-Switched Path (LSP). According to some embodiments, the MPLS cloud 64 may also include an MPLS Pseudo-Wire (PW) for connecting the first and second PE devices 56, 58. The connection may include one or more tunnels or PWs, which may be configured as Packet-Switching Network (PSN) tunnels.

The first and second AC devices 60, 62 may specifically be implemented in an MPLS Layer-2 Virtual Private Network (VPN). Thus, the MPLS-based network 50 may be configured to offer MPLS Layer-2 VPN service to connect the two customer networks using the CE devices 52, 54.

In addition, the network 50 is configured such that the PE devices 56, 58 may each utilize an UP MEP configured on the side where the AC device 60, 62 are attached to the corresponding PE device 56, 58. The UP MEP devices may be configured on the AC device side to enable monitoring (e.g., Service Level Agreement monitoring, etc.) of the network 50.

The network 50 may use standard MPLS control headers to encapsulate the provider CFM packet for UP MEP at the first PE device 56, using a new G-ACh channel-type to identify CFM Layer-2 packet over MPLS. This may be done by using the new G-ACh channel-type to aid peer PE device (i.e., the second PE device 58) to uniquely identify the packet as a CFM control packet. In this way, the network 50 may allow CFM packets to be encapsulated and filtered so as to resolve the problems associated with conventional systems.

For CFM over MPLS PWs, when the PW of the MPLS cloud 64 is configured to have a Control Channel (CC) type equal to 1, the PW label header would be followed by G-ACh. When the PW has CC-type equal to 4, the PW label header would be followed by the new G-ACh Label (referred to herein as "GAL"). The GAL header is then followed by G-ACh.

For CFM over MPLS tunnels, the MPLS tunnel label header would be followed by GAL, then G-ACh. Additionally, this solution would also be able to handle other proprietary or non-standard control streams presently used in Inter-Switch Trunk (IST) packets over PW, used in MC-LAG configurations.

The table below shows an embodiment of new field values that may be used regarding the new G-ACh channel-type:

| Field Name | Changes proposed | Protocol Applicability | Usage Details |
| --- | --- | --- | --- |
| G-ACh Channel-Type | Using a new value that is currently in the unreserved range (from IANA directory) | CFM | A new value, such as various unassigned ranges, would mean a CFM control protocol as payload and would be trapped |

Similarly, the new channel-type may be introduced for each of other network-generated packets like ICL (Inter-Chassis Link) or other IST packets.

Virtual Circuit Connection Verification (VCCV) is a protocol for verifying connections for a Pseudo-Wire (e.g., the PW of the MPLS cloud 64). VCCV may include a Control Channel (CC) between ingress and egress points of the PW over which connectivity verification messages can be sent. When the first PE device 56 sends an MPLS Echo Request packet to the second PE device 58 using an LSP ping procedure, the first PE device 56 can encapsulate the packets with VC (T-LDP) label (bottom) and transport (LDP or RSVP) label (top). When the packets arrive at the second PE device 58 with the VC label, the second PE device 58 may apply a normal forwarding procedure to the packets to forward the packets to the second CE device 54 as if they were data packets.

Before an LSP ping for PW can be used, the PW endpoints at the PE devices 56, 58 will agree on VCCV capabilities so that VCCV messages can be properly interpreted and processed locally as OAM messages by the receiving PE device. When a PW is first signaled by the first PE device 56 using LDP, a message may be sent to the second PE device 58 requesting that a PW be established. This message is extended to include VCCV capability information, which indicates to the second PE device 58 what combinations of Control Channel (CC) and Connectivity Verification (CV) types it is capable of receiving. The second PE device 58 may include the same information when it agrees to establish the PW.

Once the PW is established, the PE devices 56, 58 can send VCCV messages based on the CC and CV type combinations. VCCV defines an encapsulation for these messages, which identify them as belonging to the CC for the PW and allow the second PE device 58 to process the messages as if they were data packets. The various CC types, which define the types of channels that the VCCV can support, may include a PW control word, an MPLS router alert label, and MPLS inner label Time-to-Live (TTL) value, etc. The CCs can carry several types of protocols, which may be defined by Connectivity Verification (CV) types, including, for example, an ICMP ping, an LSP Ping, BFD, etc. The information about the CC and CV types may be signaled in the Interface Parameter sub-TLV of LDP messages.

Figure 4:
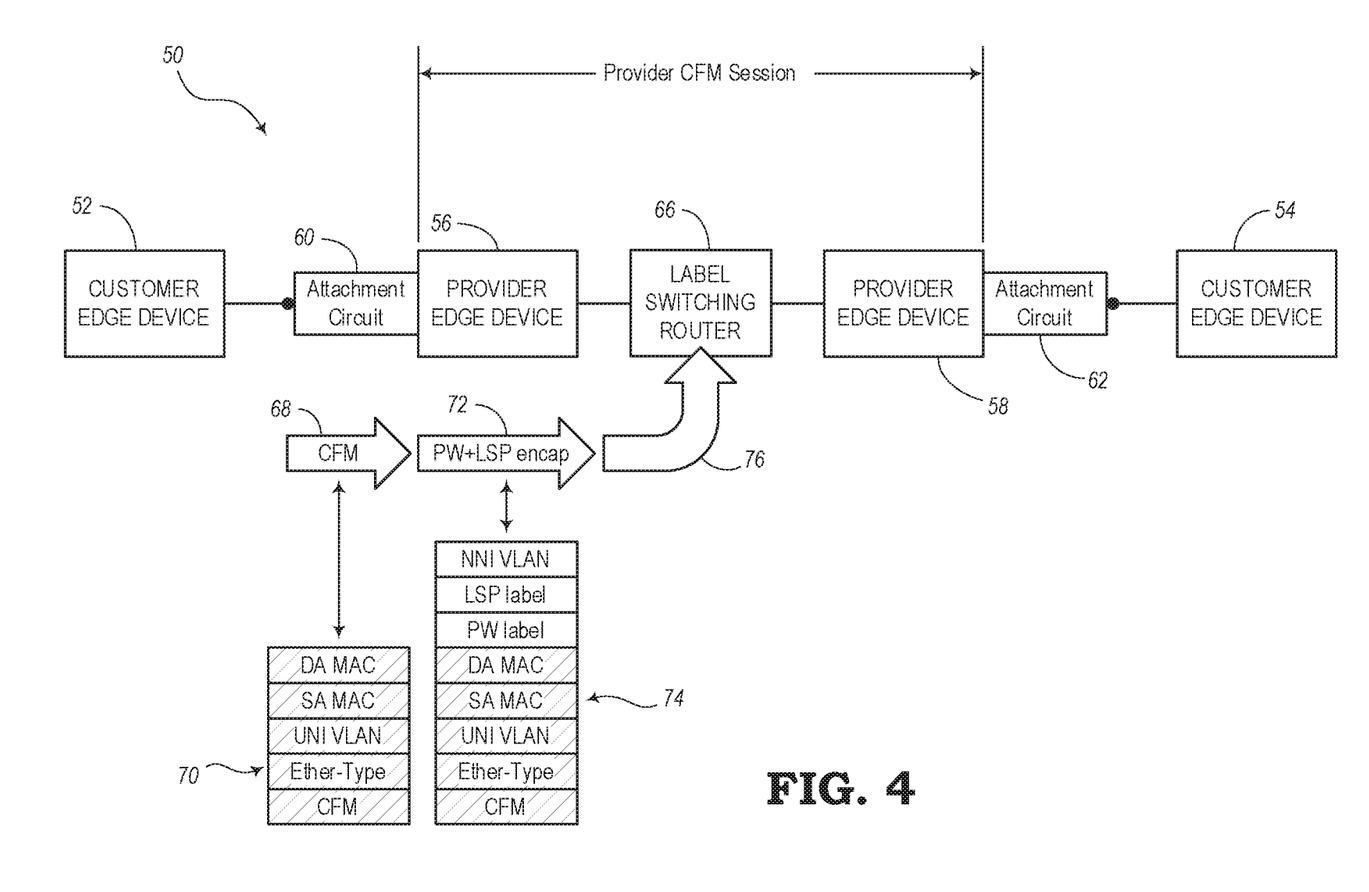
FIG. 4 is a block diagram showing the network of FIG. 3 and associated label stacks, according to some embodiments.

FIG. 4 is a block diagram showing the network 50 of FIG. 3. In this embodiment, a provider CFM session (UP MEP) may be established between the first and second PE devices 56, 58. At the input of the first PE device 56, a CFM packet 68 (corresponding to the UP MEP) is generated internally from the port of the first AC device 60. The CFM packet 68 in this example includes a header stack 70 having a Media Access Control (MAC) address for a Destination Address (i.e., "DA MAC" field), a MAC address for a Source Address (i.e., "SA MAC" field), a User-Network Interface (UNI) Virtual Local Area Network (VLAN) (i.e., "UNI VLAN" field), an Ether-Type field, and a CFM field. Since the CFM packet 68 has not yet entered the MPLS domain, it does not have MPLS labels at this point but includes the header stack 70.

The first PE device 56 is configured to encapsulate the CFM packet 68 and LSP headers as payload on a PW packet. The packet 72, which includes the CFM packet 68 encapsulated with the PW and LSP labels, includes a label stack 74 having a Network-to-Network Interface VLAN header (i.e., NNI VLAN), an LSP header, a PW header, on top of the previous header stack 70 (which includes the DA MAC, SA MAC, UNI VLAN, Ether-Type, and CFM fields).

In this embodiment, the LSR 66 may be configured to consume the packet 72. However, in this case, the CFM packet received on an NNI port may be incorrectly filtered and processed by the LSR 66. As such, it may be beneficial to add a G-ACh header with the new channel type.

Figure 5:
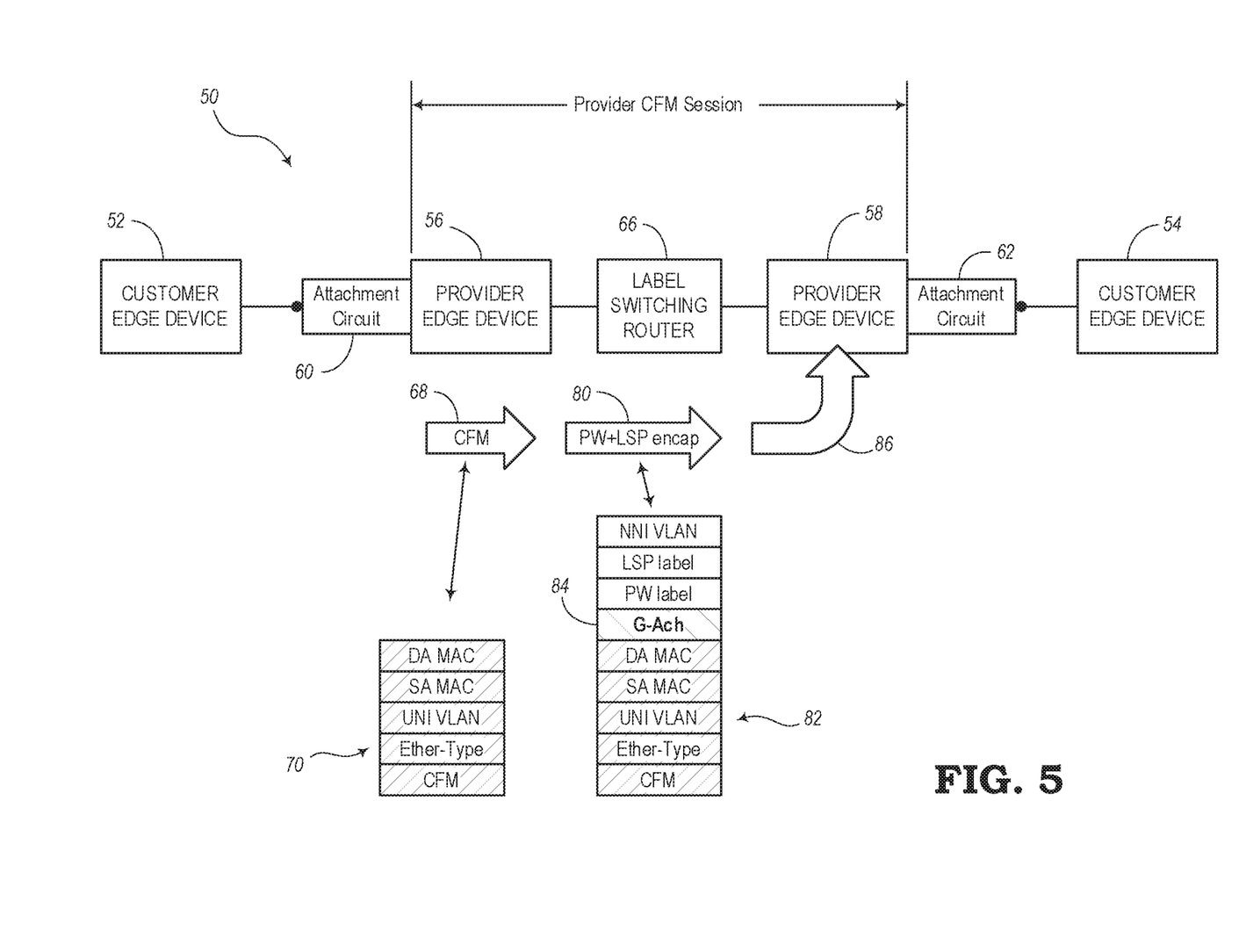
FIG. 5 is a block diagram showing the network of FIG. 3 and associated label stacks, according to other embodiments.

FIG. 5 is a block diagram illustrating the network 50 shown in FIGS. 3 and 4 for establishing a provider CFM session between the PE nodes. As mentioned above, the CFM packet 68 (corresponding to the UP MEP) may be generated internally from the port of the first AC device 60 at the input of the first PE device 56. The CFM packet 68 includes the header stack 70 having the DA MAC header, the SA MAC header, the UNI VLAN header, the Ether-Type field, and the CFM payload.

Again, the first PE device 56 may be configured to encapsulate the CFM packet 68 and LSP headers as payload on a PW packet. However, according to some embodiments, a new packet 80 includes a newly-created G-ACh header 84 in a label stack 82. The packet 80 therefore includes the CFM packet 68 encapsulated with the PW and LSP labels, having the label stack 82 including the NNI VLAN header, the LSP header, and the PW header on top of the previous header stack 70 (which includes DA MAC header, SA MAC header, UNI VLAN header, Ether-Type field, and CFM payload). In this embodiment, however, the label stack 82 further includes the G-ACh header 84.

In particular, the G-Ach header 84 may be configured such that it has a specific channel-type, such as, for example, equal to "0x7FF7," for example, which can be used to uniquely identify a provider CFM packet at a remote end of the second PE device 58. Therefore, instead of allowing the LSR 66 to consume the packet 80 (as is shown with respect to FIG. 4, where the LSR 66 consumes the packet 72), the CFM packet is properly received on an NNI port of the second PE device 58, which enables the properly received CFM packet 68 to be correctly filtered and processed by the second PE device 58. Thus, the G-ACh header 84 allows the packet 80 to bypass the LSR 66 for proper processing within the service provider level where the CFM session is established between the PE devices 56, 58.

Figure 6:
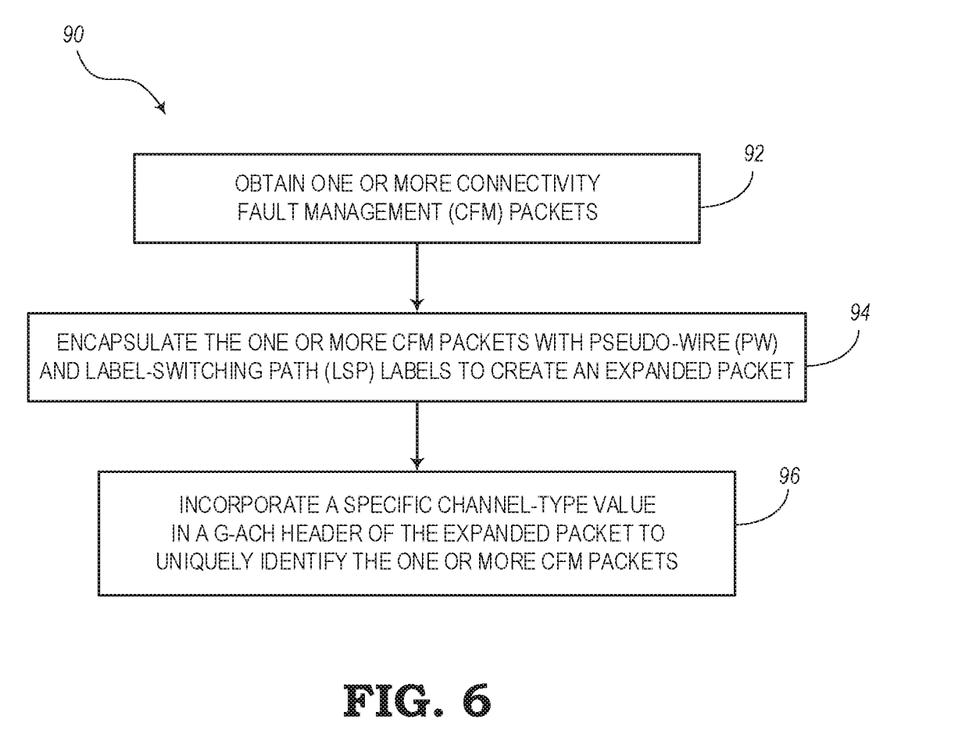
FIG. 6 is a flow diagram showing a method for performing a provider CFM session, according to some embodiments of the present disclosure.

FIG. 6 is a flow diagram showing an embodiment of a method 90 for performing a provider CFM session. The method 90 includes a step of obtaining (e.g., receiving or generating) one or more CFM packets, as indicated in block 92. The method 90 also includes the step of encapsulating the one or more CFM packets with PW and LSP labels to create an expanded packet, as indicated in block 94. Also, the method 90 includes the step of incorporating a specific channel-type value (e.g., a new reserved value from the currently unreserved range in the LANA directory) in a G-ACh header of the expanded packet to uniquely identify the one or more CFM packets, as indicated in block 96. The objective of the new value is to recognize the payload as a CFM packet.

The new (or currently unreserved) channel-type value may be chosen by the standard body to include any currently unused value in the channel-type field in the G-ACh header. For example, currently unused values include the ranges of 0x0003-0x0006, 0x0010-0x0020, 0x002B-0x0056, 0x005A-0x7FF7, 0x8000-0x8901, and 0x8903-0xFFFF. Of course, another value could be used including a currently used value that is repurposed or reassigned. This new value may be used to identify the payload in the packet as a CFM payload. In some embodiments, the G-Ach Label (GAL) header may be used to identify the presence of the G-ACh header following immediately in the packet. The presence of the GAL in the packet may be conditional and may depend, for example, on the configuration of the associated PW. Thus, the present disclosure is able to cater two different configurations (i.e., one when GAL is present and the other when GAL is absent).

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Therefore, according to various embodiments, the systems and methods of the present disclosure may be configured to provide novelty with respect to a new specific Channel-Type value to filter CFM packets, such that a resultant packet format will be compliant with RFC. Using packet captures, it may be possible to see the existence of the G-ACh header as discussed in the present disclosure, particularly by observing the new Channel-Type value (e.g., 0x7FF7) as mentioned herein.

The systems and methods may provide benefits over conventional systems. For example, the present disclosure provides systems and methods that are configured to comply with standard MPLS control header formats. With the G-ACh header immediately after a PW label header for CC type 1, and with the G-Ach Label (GAL) immediately after either the PW label header for CC type 4 or tunnel label header, the present systems may be able to avoid issues of conventional system.

Also, handling network-generated packets (e.g., CFM, ICL, and other control packets) by using generic filters, instead of DPI filters, may help in reducing complexity in the SDN controller. As such, this may result in a better SDN solution, which can be an additional benefit with respect to conventional systems. Furthermore, the present solutions may lead to accurate Y.1731/CFM-based Delay Measurement results, thus leading to better SLA compliance in networking products, particularly those that support CFM and ICL packets either in hardware or software (e.g., access devices, aggregation devices, packet optical cards, hardware chipsets supporting CFM, etc.). The systems and methods of the present disclosure may also be used to enhance various standards, such as the standard regarding the use of G-ACh channel types in the Internet Assigned Numbers Authority (IANA) registry.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system configured to operate in a Multi-Protocol Label Switching (MPLS) network, comprising
a processing device, and
a memory device configured to store instructions that, when executed, cause the processing device to
obtain a Connectivity Fault Management (CFM) packet,
encapsulate the CFM packet with Pseudo-Wire (PW) and Label-Switched Path (LSP) labels to create an expanded packet,
incorporate a specific channel-type value in a Generic Associated Channel (G-ACh) header of the expanded packet to uniquely identify the CFM packet, and
use MPLS control headers to encapsulate the CFM packet of an up Maintenance End Point (UP MEP) associated with Attachment Circuit (AC) using the specific channel-type value in the G-ACh header.

2. The system of claim 1, wherein the instructions, when executed, further cause the processing device to utilize the specific channel-type value in the G-ACh header to identify the CFM packet over MPLS.

3. The system of claim 1, wherein the instructions, when executed, further cause the processing device to perform a service provider CFM session between provider edge devices.

4. The system of claim 1, wherein the CFM packet is a G-ACh payload.

5. The system of claim 1, wherein the specific channel-type value is associated with the G-ACh header and depends on a Pseudo-Wire (PW) configuration.

6. The system of claim 1, wherein the specific channel-type value in the G-ACh header is configured to be a reserved value in the IEEE 802.1ag standard.

7. A network element of a Multi-Protocol Label Switching (MPLS) network, the network element includes circuitry configured to
obtain a Connectivity Fault Management (CFM) packet,
encapsulate the CFM packet with Pseudo-Wire (PW) and Label-Switched Path (LSP) labels to create an expanded packet,
incorporate a specific channel-type value in a Generic Associated Channel (G-ACh) header of the expanded packet to uniquely identify the CFM packet, and
use MPLS control headers to encapsulate the CFM packet of an up Maintenance End Point (UP MEP) associated with an Attachment Circuit (AC) using the specific channel-type value in the G-ACh header.

8. The network element of claim 7, further configured to utilize the specific channel-type value in the G-ACh header to uniquely identify the CFM packet over MPLS.

9. The network element of claim 7, further configured to perform a service provider CFM session between provider edge devices.

10. The network element of claim 7, wherein the CFM packet is a G-ACh payload.

11. The network element of claim 10, wherein the specific channel-type value is associated with the G-ACh header and depends on a Pseudo-Wire (PW) configuration.

12. A non-transitory computer-readable medium configured to store programmable computer logic having instructions that, when executed, cause one or more processing devices, that are configured to operate in operate iwthin a Multi-Protocol Label Switching (MPLS) network, to
obtain a Connectivity Fault Management (CFM) packet,
encapsulate the CFM packet with Pseudo-Wire (PW) and Label-Switched Path (LSP) labels to create an expanded packet,
incorporate a specific channel-type value in a Generic Associated Channel (G-ACh) header of the expanded packet to uniquely identify the CFM packet, and
use MPLS control headers to encapsulate the CFM packet of an up Maintenance End Point (UP MEP) associated with an Attachment Circuit (AC) using the specific channel-type value in the G-ACh header.

13. The non-transitory computer-readable medium of claim 12, wherein the instructions, when executed, further cause the one or more processing devices to utilize the specific channel-type value in the G-ACh header to identify the CFM packet over MPLS.

14. The non-transitory computer-readable medium of claim 12, wherein the instructions, when executed, further cause the one or more processing devices to perform a service provider CFM session between provider edge devices.

15. The non-transitory computer-readable medium of claim 12, wherein the CFM packet is a G-ACh payload, and wherein the specific channel-type value is associated with the G-ACh header and depends on a Pseudo-Wire (PW) configuration.

* * * * *